(12) United States Patent
Graham et al.

(10) Patent No.: US 6,220,112 B1
(45) Date of Patent: Apr. 24, 2001

(54) THROTTLE CONTROLLED TRANSMISSION LOCKOUT

(75) Inventors: Dennis Graham, Reading; Charles Peniston, Quakertown; Ronda Poirier, Birdsboro; Larry Castellucci, Reading, all of PA (US)

(73) Assignee: Teleflex Incorporated, Plymouth Meeting, PA (US)

( * ) Notice: Subject to any disclaimer, the term of this patent is extended or adjusted under 35 U.S.C. 154(b) by 0 days.

(21) Appl. No.: 09/398,485

(22) Filed: Sep. 17, 1999

Related U.S. Application Data

(63) Continuation-in-part of application No. 09/021,659, filed on Feb. 10, 1998.

(51) Int. Cl.[7] ............................. G05G 1/14; F16H 61/22
(52) U.S. Cl. ........................... 74/483 R; 74/513; 477/125
(58) Field of Search ..................... 74/473 R, 473.21, 74/473.24, 473.25, 483 R, 483 K, 478, 512, 513, 514, 560; 477/121, 125

(56) References Cited

U.S. PATENT DOCUMENTS

| | | | |
|---|---|---|---|
| 3,741,045 | * | 6/1973 | Kobayashi ............................. 74/876 |
| 3,765,261 | * | 10/1973 | Hobbins ............................. 74/473.21 |
| 4,114,738 | * | 9/1978 | Brown ................................. 192/4 A |
| 4,255,984 | * | 3/1981 | Abels et al. ............................. 74/512 |
| 4,608,879 | * | 9/1986 | Ishida et al. ............................. 74/512 |
| 4,986,143 | * | 1/1991 | Livshits et al. .................... 74/473.21 |
| 5,063,817 | * | 11/1991 | Bogert ..................................... 74/878 |
| 5,083,951 | * | 1/1992 | Baba ..................................... 440/86 |
| 5,129,494 | * | 7/1992 | Rolinski et al. .................... 74/483 R |
| 5,193,640 | * | 3/1993 | Lee ......................................... 74/512 |
| 5,309,744 | * | 5/1994 | Kito et al. ........................... 74/483 R |
| 5,490,585 | * | 2/1996 | Togano ............................... 74/483 R |
| 5,695,429 | * | 12/1997 | Kataumi et al. .................... 74/483 K |
| 5,797,295 | * | 8/1998 | Kataumi et al. .................... 74/483 R |

* cited by examiner

*Primary Examiner*—David A. Bucci
*Assistant Examiner*—Chong H. Kim
(74) *Attorney, Agent, or Firm*—Howard & Howard

(57) ABSTRACT

An assembly (10) for interconnecting the throttle and transmission whereby the transmission is locked in neutral for shifting from gear to gear unless the throttle is at idle. A guide member (22) engages opposite edges of a slider member (12) on the front and supports an actuator (18) on the rear. The slider member (12) has a hole (20) therein for receiving a locking pin (16) to lock the slider member (12) in the neutral position. The locking pin (16) is biased out of engagement with the slider member (12) by a return spring (44) whereas a compression spring (48) allows lost motion movement of an actuator pin (46) relative to the locking pin (16) under the force of a throttle moved cam (54) when the locking pin (16) is in abutting engagement with the slider member (12). The slider member (12) and the cam (54) may be connected to the transmission and throttle respectively by motion transmitting cable assemblies.

14 Claims, 4 Drawing Sheets

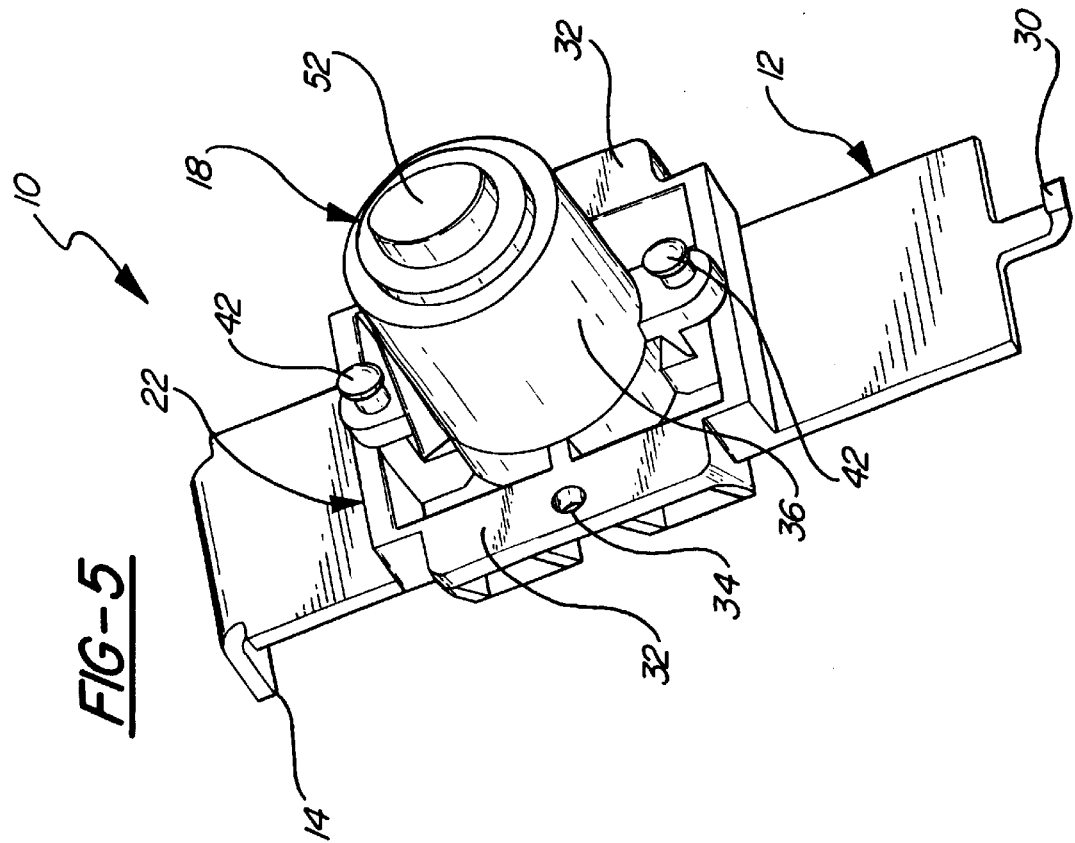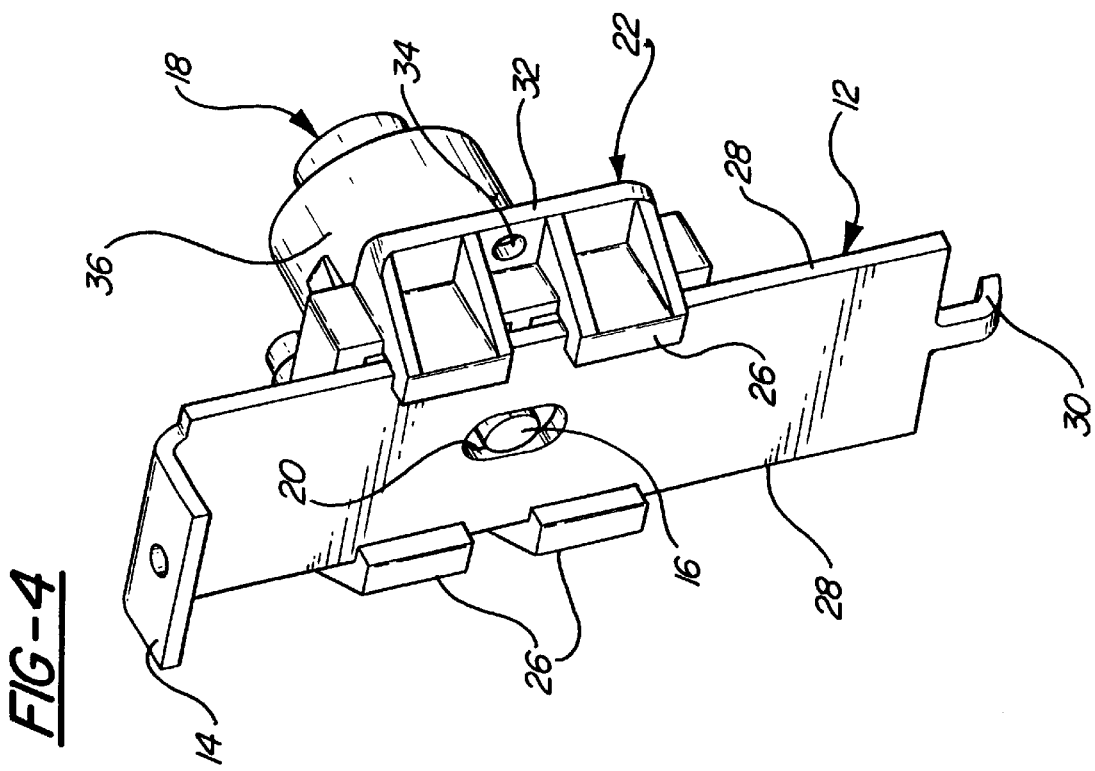

THROTTLE CONTROLLED TRANSMISSION LOCKOUT

RELATED APPLICATION

The subject application is a continuation-in-part of co-pending application Ser. No. 09/021,659 filed Feb. 10, 1998.

BACKGROUND OF THE INVENTION

1. Technical Field

The subject invention relates to an assembly which protect transmissions from damage caused by changing gears when the throttle is out of the idle condition.

2. Description of the Prior Art

As is well known, transmissions can be damaged when shifted between gears while the engine is operating at a high rpm, i.e., the throttle is out of the idle position.

Many assemblies are known to prevent shifting of the transmission when the throttle is out of the idle position. Most of these assemblies are incorporated into the design of the throttle and transmission controls. One such system is shown in U.S. Pat. No. 5,063,817 to Bogert.

A pedal operated by an operator's foot is used to control engine speed on a boat whereas a hand control lever is used to shift the engine. In many instances, the foot throttle control operates independently of the shift control, making it possible to shift into gear at a high engine RPM, thereby causing damage to the engine transmission. There remains a need for a simple assembly which may be added to a wide variety of existing transmissions systems without modification to those systems.

SUMMARY OF THE INVENTION AND ADVANTAGES

An assembly for interconnecting the throttle and transmission whereby the transmission is locked in neutral for shifting from gear to gear unless the throttle is at idle.

The invention, therefore, provides a throttle controlled transmission lockout assembly for preventing shifting of the transmission above idle and comprising a slider member including an attachment for connecting the slider to a transmission control; and locking pin for engaging the slider member; an actuator responsive to the position of the throttle for moving the locking pin into engagement with the slider member. The slider member has first and second ends and a hole therein between the ends for receiving the locking pin when the slider member is in a neutral position coinciding with the neutral position of the transmission. The assembly is characterized by a guide member slidably supporting the slider member for rectilinear movement in response to movement of the transmission control.

Accordingly, the subject invention provides a lockout assembly which mechanically interconnects the foot throttle and the hand shift lever for preventing the operator from shifting into gear when the engine RPM is above idle. The lockout assembly may be used with any hand lever that has adequate space for the cable to be attached to the shift arm.

BRIEF DESCRIPTION OF THE DRAWINGS

Other advantages of the present invention will be readily appreciated as the same becomes better understood by reference to the following detailed description when considered in connection with the accompanying drawings wherein:

FIG. 4 is a perspective view from the side of the slider member;

FIG. 5 is a perspective view from the side of the actuator; and

DESCRIPTION OF THE BEST MODE

Referring to the Figures, wherein like numerals indicate like or corresponding parts throughout the several views, a throttle controlled transmission lockout assembly 10 for preventing shifting of the transmission above idle is generally shown at 10.

Figure 1:
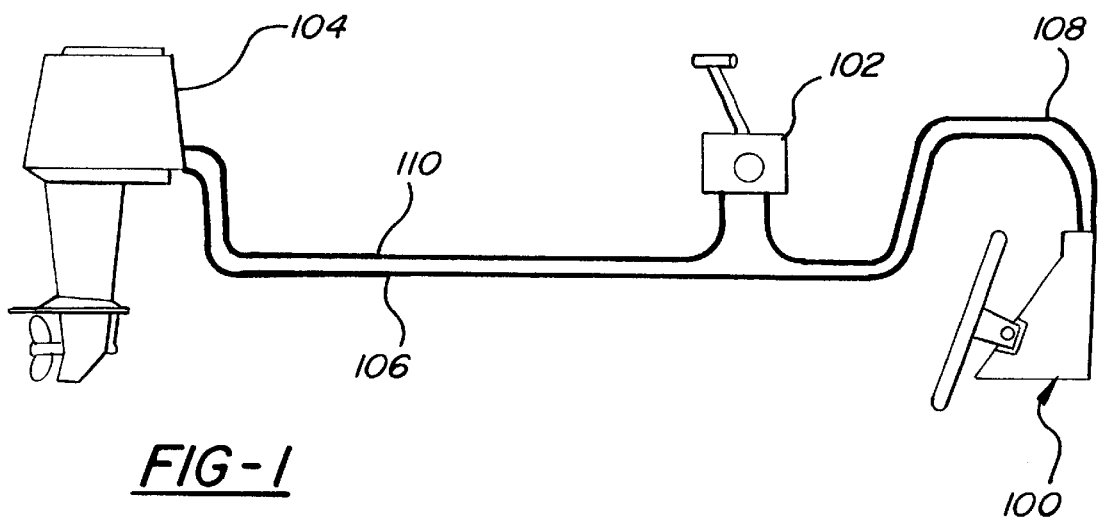
FIG. 1 is a schematic view of a combination in which the subject invention finds utility.
Figure 2:
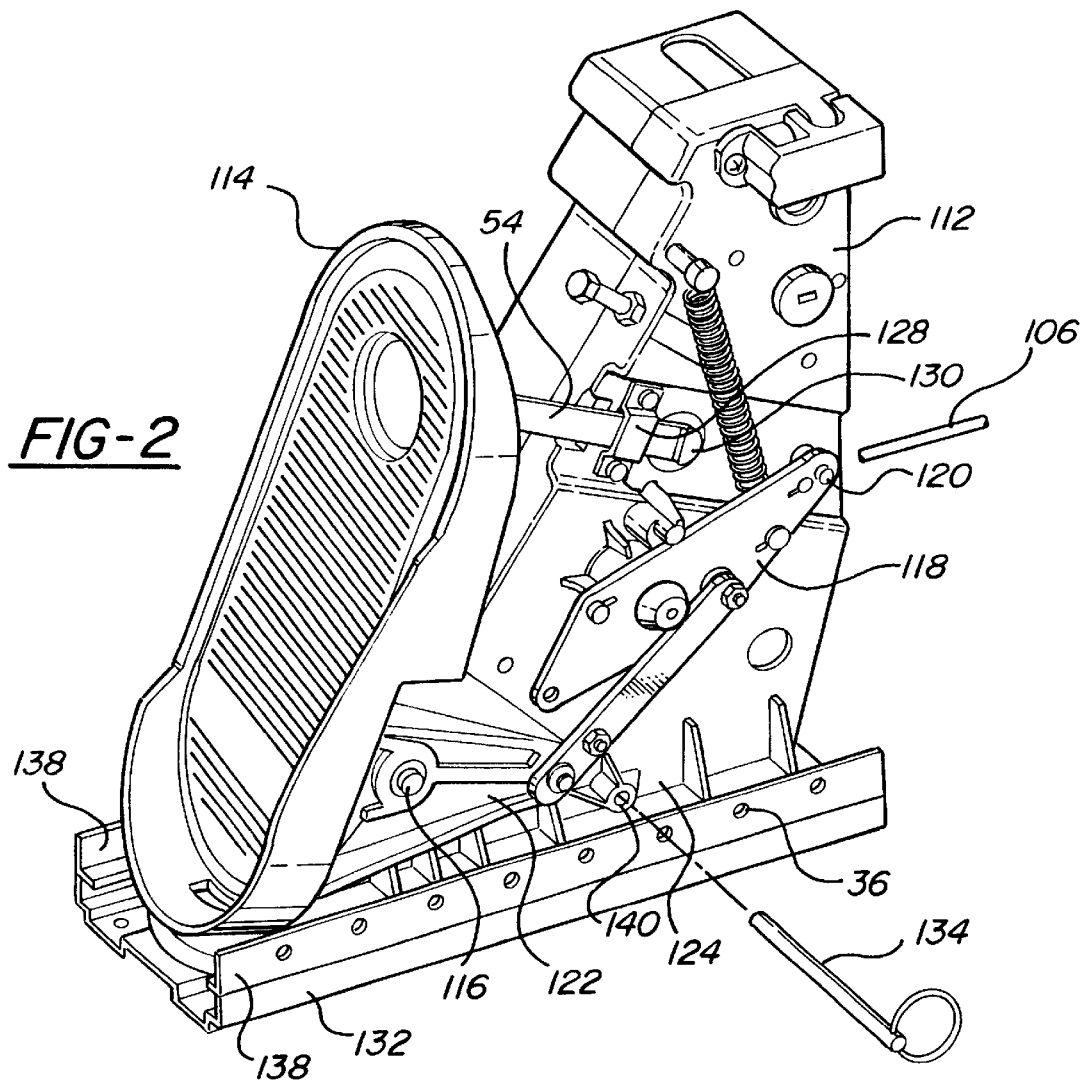
FIG. 2 is a perspective view from one side of a foot pedal assembly in which the subject invention may be utilized.
Figure 3:
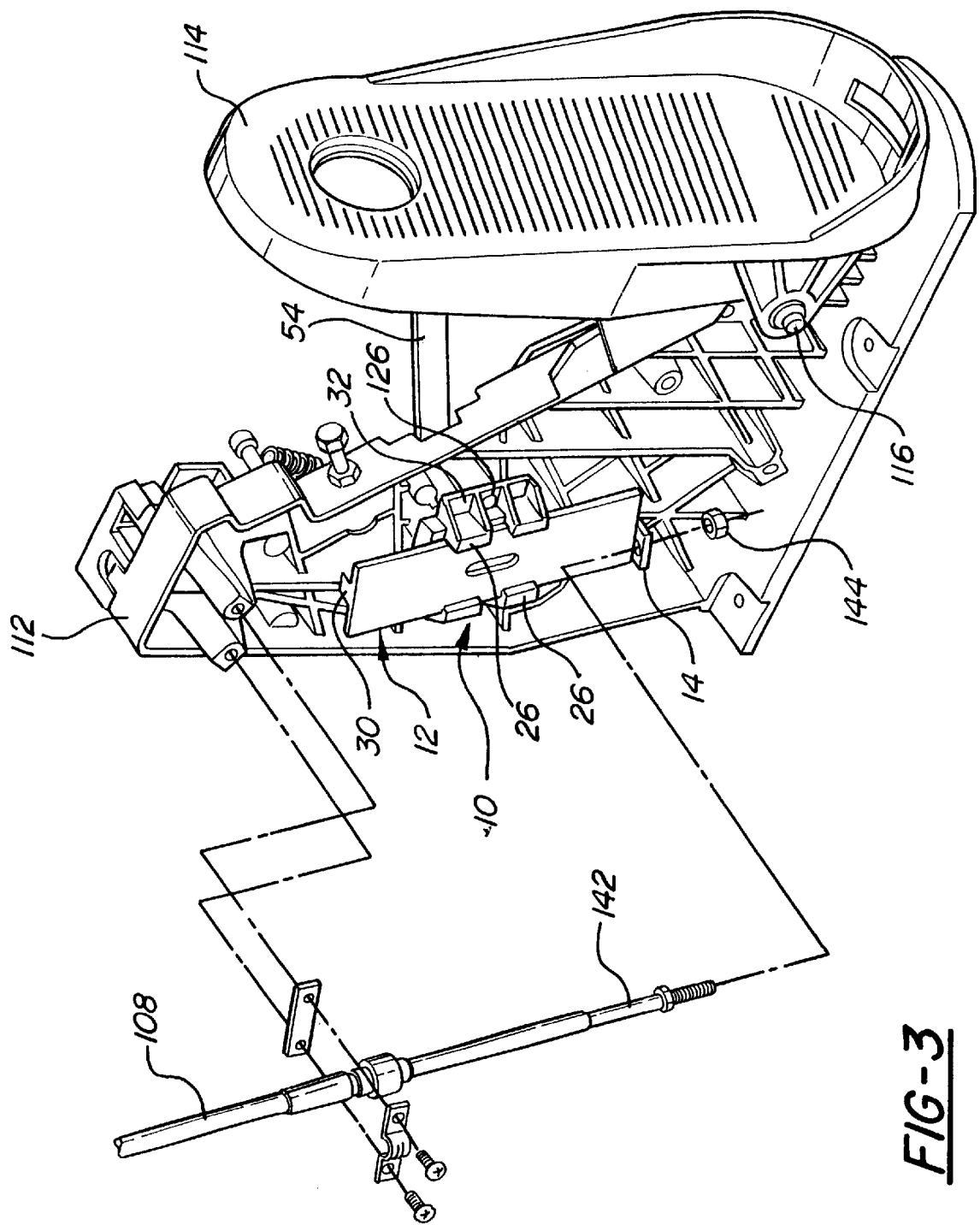
FIG. 3 is a perspective view from the other side of a foot pedal assembly of FIG. 2.
Figure 6:
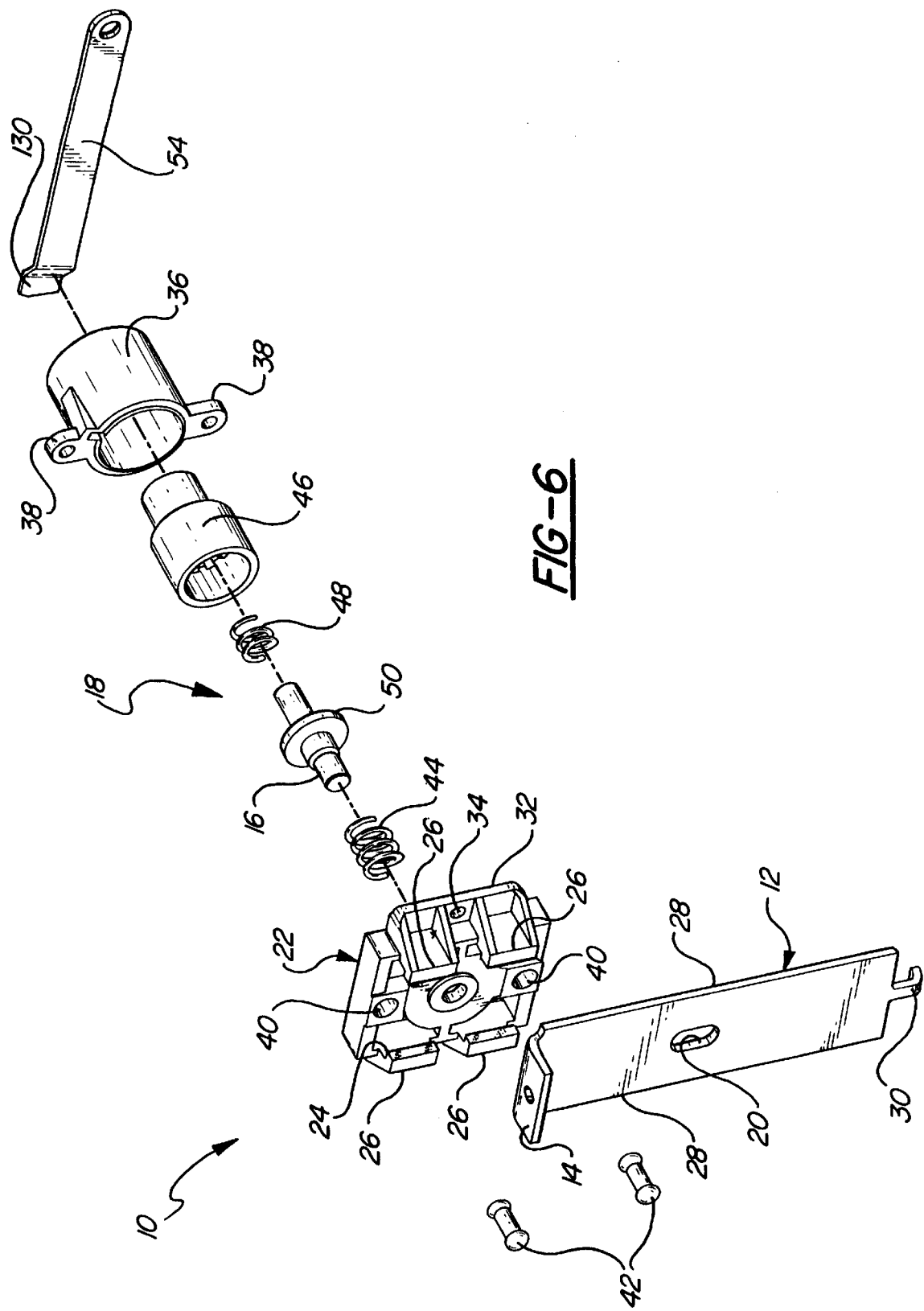
FIG. 6 is an exploded perspective view from side of the slider member.

As alluded to above, the lockout assembly 10 may be utilized in combination with various parts of an engine control system, an example environment is shown in FIGS. 1–3. A foot pedal assembly generally shown at 100 is combined with a lever control 102 to control the engine 104. A throttle cable 106 interconnects the foot pedal assembly 100 and the engine 104 and a shift lockout cable 108 interconnects the lockout assembly 10 and the lever control 102. A shift cable 110 interconnects the lever control 102 and the engine 104. All of the cables comprise a conduit for movably supproting a motion transmitting core element, as is wellknown in the art.

The assembly 10 comprises a slider member or plate, generally indicated at 12. The slider member 12 includes a shift lever connection tab 14 for connecting the slider member 12 to a transmission control. More specifically, a motion transmitting remote control assembly having a core element movably supported in a conduit may interconnect the transmission and the slider member 12 by having the core element connected to the hole in the attachment tab.

A locking pin 16 is included for engaging the slider member 12 and an actuator, generally indicated at 18, is responsive to the position of the throttle for moving the locking pin 16 into engagement with the slider member 12. The slider member 12 has first and second ends and a hole 20 therein between the ends for receiving the locking pin 16 when the slider member 12 is in a neutral position coinciding with the neutral position of the transmission. The shift lever connection tab 14 is disposed at the first end of the slider member 12.

The assembly 10 is characterized by a guide member, generally indicated at 22, slidably supporting the slider member 12 for rectilinear movement in response to movement of the transmission control. The guide member 22 includes oppositely facing grooves 24 defined by hooks 26 which extend upwardly from the sides and on the front of the guide member 22 with the guide member 22 presenting a backup surface between the hooks 26. The slider member includes parallel side edges 28 slidably disposed in the grooves 24 and slidably engaging the backup surface of the guide member 22 between the hooks 26. The slider member 12 also includes a stop 30 at the second end for preventing the slider member 12 from being removed from the guide member.

The guide member 22 also includes support flanges 32 for attaching the guide member 22 to a support structure. More specifically, the support flanges 32 have holes 34 therethrough for receiving support fasteners. In addition, triangular webs interconnect the support flanges 32 and the hooks 26 for strengthening reinforcement of the support flanges 32 and the hooks 26.

The actuator 18 includes a housing 36 supported on the guide member 22 for slidably supporting the locking pin 16. The housing 36 includes mounting ears 38 and the guide member 22 has mounting holes 40 therethrough and disposed between the grooves 24. A pair of fasteners 42 extending through the ears and the mounting holes 40 for securing the housing 36 to the rear of the guide member 22 with the fasteners 42 being disposed under the slider member 12. That is, the fasteners 42 have flat heads and the holes are countersunk whereby the slider member 12 moves freely over the fasteners 42 without interference.

The actuator 18 includes a return spring 44 is disposed between the guide member 22 and the locking pin 16 for biasing the locking pin 16 out of the hole 20 in the slider member 12 when in the neutral position. The actuator 18 also includes an actuator pin 46 responsive to the throttle and a compression spring 48 disposed between the actuator pin 46 and the locking pin 16 for allowing lost motion between the actuator pin 46 and the locking pin 16 when the locking pin 16 is in engagement with the slider member 12 and the actuator pin 46 is out of the neutral position. In order to accommodate the springs, the locking pin 16 includes a radially extending flange 50 disposed between and engaging the springs.

The actuator pin 46 includes a cam surface 52 which is slanted or at a sloping angle relative to the longitudinal axis of the actuator pin 46. A cam 54 is adapted for connection to the throttle via the foot or accelerator pedal for engaging the cam surface 52 on the actuator pin 46 for moving the actuator pin 46 in response to movement of the throttle. As the foot pedal is moved out of idle, the cam 54 slides over the cam surface 52 to force the actuator pin 46 downward into the housing 36. If the transmission is already engaged, i.e., out of neutral, the locking pin 16 is out of the hole 20 in the slider member 12 and sliding along the surface of the slider member 12. In this condition, the return spring 44 is not compressed because the locking pin 16 is held out by the slider member 12; however, the compression spring 48 is compressed between the actuator pin 46 and the flange on the locking pin 16. As soon as the slider member 12 is moved to the neutral position, the locking pin 16 moves into the hole 20 in the slider member 12 under the force of the compression spring 48 which is stronger than the return spring 44 to thereby compress the return spring 44. When the throttle is moved to idle, the cam 54 releases the actuator pin 46 as the compression spring 48 is in the fully extended condition and the return spring 44 returns the entire actuator to the idle condition. As will be appreciated, other actuators may be utilized with the slider member 12 and guide member 22.

The foot pedal assembly 100 includes a support housing 112 and a foot pedal 114 movably supported by the support housing 112 at a pivot 116 for positioning a throttle. More specifically, the throttle cable 106 is connected to a cable arm 118 at a connection 120 which is connected to the foot pedal 114 by a crank arm 122 and lever 124. The guide member (22) is supported by said support housing 112 by mounting bolts 126 which extend through the holes 34. The cam 54 connected to said foot pedal 114 for rectilinear movement by the foot pedal 114 as guided by the strap 128 to engage the cam surface 52 on said actuator pin 46 for moving the actuator pin 46 in response to movement of the throttle. The cam 54 consists of a link which presents a ramp or an offset 130 at the distal end thereof for calming or ramping over the actuator pin 46.

The foot pedal assembly 100 includes a platform 132 shown only in FIG. 2 which is secured to the structure of the vehicle and movably supports the support housing 112 for adjustment to various positions. The adjustment is accomplished by a pin 134 extending through one of a plurality of holes 136 in side flanges 138 of the platform to cooperate with a pin positioning boss 140.

The core element of the cable assembly 108 includes a rod 142 having a threaded end which inserts into the hole in the shift lever connection tab 14 to move the slider member 12.

As will be appreciated, the actuator pin 46 acts against the spring 44 to urge the locking pin 16 into the slot 20 in response to rectilinear movement of the cam link 54, which is, in turn, moved by the foot pedal 114 to move the throttle.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A throttle controlled transmission lockout assembly (10) for preventing shift of the transmission above idle and comprising:

a slider member (12) including an attachment for connecting said slider to a transmission control;

a locking pin (16) for engaging said slider member (12);

an actuator responsive to the position of the throttle for moving said locking pin (16) into engagement with said slider member (12); and said slider member (12) having first and second ends and a slot (20) therein between said ends for receiving said locking pin (16) when said slider member (12) is in a neutral position coinciding with the neutral position of the transmission;

said assembly (10) characterized by a guide member (22) slidably supporting said slider member (12) for rectilinear movement in response to movement of the transmission control.

2. An assembly (10) as set forth in claim 1 wherein said guide member (22) includes oppositely facing grooves (24) and said slider member (12) includes parallel side edges (28) slidably disposed in said grooves (24).

3. An assembly (10) as set forth in claim 2 wherein said slider member (12) includes a transmission connection at said first end for connecting said slider member (12) to the transmission.

4. An assembly (10) as set forth in claim 3 wherein said slider member (12) includes a stop (30) at said second end for preventing said slider member (12) from being removed from said guide member.

5. An assembly (10) as set forth in claim 2 wherein said guide member (22) includes support flanges (32) for attaching said guide member (22) to a support structure.

6. An assembly (10) as set forth in claim 5 wherein said support flanges (32) have holes therethrough for receiving support fasteners (42).

7. An assembly (10) as set forth in claim 2 wherein said actuator includes a housing (36) supported on said guide member (22) for slidably supporting said locking pin (16).

8. An assembly (10) as set forth in claim 7 wherein said housing (36) includes mounting ears (38) and said guide member (22) has mounting holes (40) therethrough and disposed between said grooves (24), and fasteners (42) extending through said ears and said mounting holes (40) for securing said housing (36) to said guide member (22) with said fasteners (42) being disposed under said slider member (12).

9. An assembly (10) as set forth in claim 7 wherein said actuator includes a return spring (44) disposed between said guide member (22) and said locking pin (16) for biasing said locking pin (16) out of said slot (20) in said slider member (12) when in said neutral position.

10. An assembly (10) as set forth in claim 9 wherein said actuator includes an actuator pin (46) responsive to said throttle and a compression spring (48) disposed between said actuator pin (46) and said locking pin (16) for allowing lost motion between said actuator pin (46) and said locking pin (16) when said locking pin (16) is in engagement with said slider member (12) and said actuator pin (46) is out of the neutral position.

11. An assembly (10) as set forth in claim 10 wherein said locking pin (16) includes a radially extending flange (50) disposed between and engaging said springs.

12. An assembly (10) as set forth in claim 11 wherein said actuator pin (46) includes a cam surface (52) and including a cam (54) adapted for connection to the throttle for engaging said cam surface (52) on said actuator pin (46) for moving said actuator pin (46) in response to movement of the throttle.

13. An assembly as set forth in claim 12 including a support housing (112), a foot pedal (114) movably supported by said support housing (112) for positioning a throttle, said guide member (22) being supported by said support housing (112), and a cam (54) connected to said foot pedal (114) for rectilinear movement thereby to engage said cam surface (52) on said actuator pin (46) for moving said actuator pin (46) in response to movement of the throttle.

14. An assembly as set forth in claim 1 including a support housing (112), a foot pedal (114) movably supported by said support housing (112) for positioning a throttle, said guide member (22) being supported by said support housing (112), said foot pedal (114) and said actuator being operatively connected for moving said actuator in response to movement of the throttle.

* * * * *